G. A. POOLE.
CUE TIP.
APPLICATION FILED JULY 27, 1916.
1,235,051.
Patented July 31, 1917.
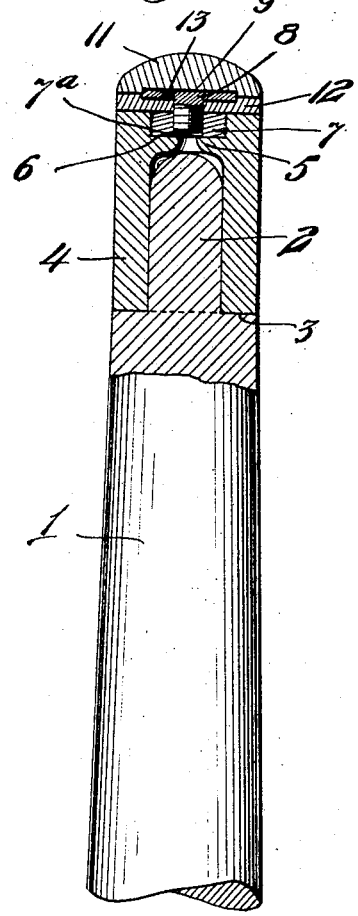
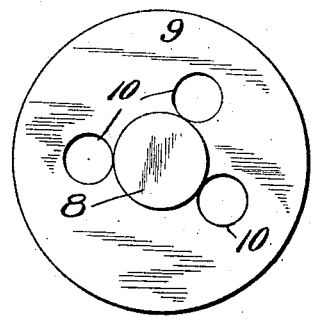
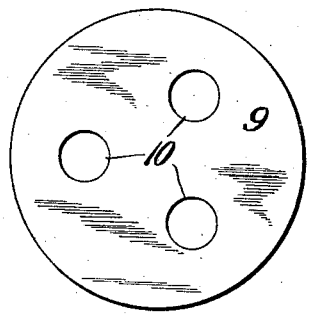
WITNESSES
INVENTOR
George A. Poole
BY Richard Bowen.
ATTORNEY

UNITED STATES PATENT OFFICE.

GEORGE A. POOLE, OF JOHNSTOWN, PENNSYLVANIA.

CUE-TIP.

1,235,051.  Specification of Letters Patent.  Patented July 31, 1917.

Application filed July 27, 1916. Serial No. 111,699.

*To all whom it may concern:*

Be it known that I, GEORGE A. POOLE, a citizen of the United States, residing at Johnstown, in the county of Cambria and State of Pennsylvania, have invented certain new and useful Improvements in Cue-Tips, of which the following is a specification.

This invention relates to cue tips.

One of the main objects of the invention is to provide a tip of simple construction and operation which can be quickly and easily attached to the cue.

A further object is to provide a tip with a screw shank firmly secured thereto, adapted to coöperate with a threaded element for securing the tip in position.

Further objects will appear from the detail description.

In the drawings:

Figure 1 is a central vertical section through the invention.

Fig. 2 is an underneath view of the securing screw, and

Fig. 3 is a top view of the same.

The cue 1 is provided at its outer end with a reduced neck 2 and an annular shoulder 3. An ivory ferrule 4 fits snugly about the neck 2 with its lower edge resting on the shoulder 3. This ferrule is provided, near its upper end, with an inwardly projecting annular flange 5 and a centrally positioned recess 6 above the flange. A brass ring 7 is firmly secured in this recess by being threaded into the same. This ring is provided with a central threaded bore 7ᵃ which receives the stem of a securing screw 8.

The screw 8 is provided with an enlarged circular head 9. This head is comparatively thin, being one-thirty-second of an inch in thickness in actual practice. A series of circular holes or apertures 10 are provided through the head adjacent the stem of the screw.

When the tip is assembled, the screw head 9 is seated snugly in alined recesses formed in the tip 11 and a disk or washer 12 interposed between the same and the upper end of the ferrule 4. The washer and the tip are cemented firmly together. Also, the apertures 10 form means whereby direct connection is established between the tip and the washer, at a plurality of points near the center of the same, so that the cement flows into these openings and forms what might be termed a plurality of connecting and securing posts. By this means the tip and washer are united near their centers at a plurality of points, this connection being located at points where the least amount of pressure is exerted when the tip is threaded into the ferrule, so that there is very little danger of twisting the tip and washer apart. In addition, as will be noted from Fig. 1, the diameter of the screw head 9 is considerably less than that of the tip and washer. This renders it possible to secure the tip to the washer at its periphery and at points extending inward a short distance from its periphery. The cement which passes through the holes 10 in the screw head in addition to serving as means for securing the washer and tip together, also forms what might be termed cement columns 13 which prevent movement of the screw 8 relatively to the tip and washer. For this reason the tip may be easily secured to the ferrule by the simple expedient of threading the screw into the ring 7, as will be clear from Fig. 1.

The cement columns 13 do not adhere to the metal of disk 9 and, for this reason, the disk, and consequently the securing screw, has a certain amount of axial movement independently of the tip and washer. By turning the tip and washer so as to thread the screw tightly into ring 7 the central portion of disk 12 will be compressed and gripped tightly between the head of the screw and the ring, thus leaving a slight space between the outer face of screw head 9 and the underface of tip 11. This serves to secure the screw head out of direct contact with the tip and increases the resiliency of the tip. Also, the shock due to the impact of the tip with the ball, when the cue is in use, will be transmitted directly to the washer 12, which is of leather or other suitable resilient material, thus providing a cushion mounting for the tip and transmitting all shock directly to the body of the cue, which serves to relieve the securing screw 8 of all unnecessary strain. The cement columns 13, while permitting this slight independent axial movement of the securing screw serve to effectually prevent independent rotation of the screw, as above stated.

The structure composed of the tip 11 and the washer 12 may be firmly secured to the upper end of the ferrule 4 so as to be fixed relatively thereto by coating the under face of the washer with a suitable cement. When the tip becomes worn out, broken, or for any other reason it is desired to remove it, it may be quickly and easily removed by loosening the washer from the ferrule and turning the tip so as to unthread the screw 8 from the ring 7. The tip which has been removed can be quickly and easily replaced by the simple expedient of turning the screw of the new tip into the ring 7 of the ferrule and then securing it to the ferrule by cementing, as before.

By my construction, I have produced a cue tip provided with a screw which is firmly secured to the same. Also, I utilize the means for preventing rotation of the screw relatively to the tip for the further function of securing the tip and washer firmly together. In addition, by providing the perforations, or holes in the screw head 9, I secure the tip and washer together at a plurality of points near their centers, this producing a structure of relatively great strength.

What I claim is:

In cue tip securing means, a cue, a ferrule secured thereon, a tip, a washer secured on the underface of said tip, and a securing screw having a disk-like head provided with a plurality of apertures secured between the washer and tip, said tip and washer being provided with registering recesses to receive the head of said screw, the washer and tip being secured together by cementing so as to form cement columns connecting the tip and washer and extending through the apertures of said screw head whereby axial movement of the screw independent of the tip and washer is permitted and the screw is secured against independent rotary movement.

In testimony whereof I affix my signature in presence of two witnesses.

GEORGE A. POOLE.

Witnesses:
Geo. C. Keim,
S. Ethal Weimer.

Copies of this patent may be obtained for five cents each, by addressing the "Commissioner of Patents, Washington, D. C."